(No Model.)
C. S. FLEMING.
CASTER.
No. 468,195. Patented Feb. 2, 1892.
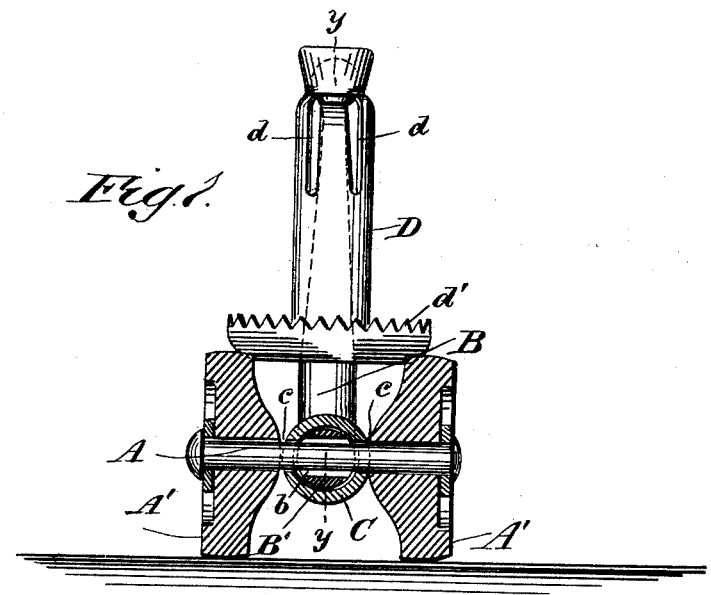
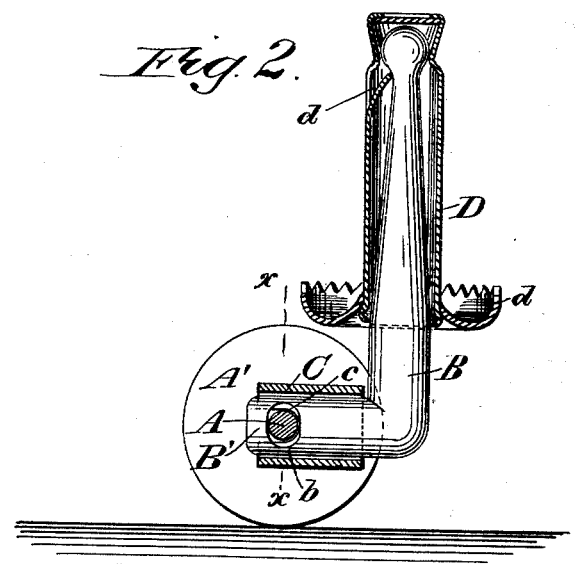
WITNESSES:
F. McArdle
C. Sedgwick
INVENTOR:
C. S. Fleming
BY Munn & Co
ATTORNEYS

UNITED STATES PATENT OFFICE.

CAUGHEY S. FLEMING, OF SHELBYVILLE, INDIANA.

CASTER.

SPECIFICATION forming part of Letters Patent No. 468,195, dated February 2, 1892.

Application filed March 25, 1891. Serial No. 386,338. (No model.)

*To all whom it may concern:*

Be it known that I, CAUGHEY S. FLEMING, of Shelbyville, in the county of Shelby and State of Indiana, have invented a new and Improved Caster, of which the following is a full, clear, and exact description.

The invention relates to two-wheeled casters for furniture, trucks, and the like; and the object of the invention is to provide a caster which shall be capable of tilting in its support, thereby enabling it to more readily ride over obstructions.

The invention consists in the construction hereinafter particularly described, and defined in the claim.

Reference is to be had to the accompanying drawings, forming a part of this specification, in which similar letters of reference indicate corresponding parts in all the figures.

Figure 1 is a sectional front elevation of a caster constructed in accordance with my invention, the section being taken on the line $x\ x$ of Fig. 2. Fig. 2 is a sectional side elevation, the section being taken on line $y\ y$ of Fig. 1; and Fig. 3 is a side view of the sleeve which forms the actual bearing for the axle of the caster-wheels.

The specific embodiment of my invention as illustrated, it will be understood, is but a preferred form of the invention, various modifications being possible without departing from my generic invention of a tilting caster.

In the form shown the wheels $A'$ are mounted on an axle $A$, which passes transversely through a transverse aperture $b$ in the horizontally-bent lower end $B'$ of the spindle $B$, said spindle being swiveled in any approved manner or fitted in any of the well-known sockets. The opening $b$ is of such a size and form relatively to the axle $A$ as to permit a tilting movement of the latter. In the instance shown said opening is of oval form. On the horizontal member $B'$ of the spindle is fitted a sleeve $C$, having side openings $c$, which align with each other and with the opening or aperture $b$, the openings $c$ being of a size to snugly receive the axle $A$ and form the bearing for the same. The sleeve $C$ is capable of a free movement around the end $B'$ of the spindle within the limits of the opening $b$, and consequently as the axle tilts in response to the rising of one of the wheels when encountering an obstruction, the axle and its bearing-sleeve will rock or tilt in unison.

The socket $D$ shown is formed with integral inwardly-extending spring-tongues $d$, produced by punching inward portions of the said socket, and with an upturned flange $d'$ for bearing against the table-leg or similar article. Any other form of socket will answer, and the one shown forms no part of my invention.

Having thus fully described my invention, I claim as new and desire to secure by Letters Patent—

The combination, in a caster, of a spindle or support having a horizontally-ranging member, a sleeve loose thereon, and wheels whose axle passes through said sleeve and spindle, the axle having its bearing in the sleeve and capable of tilting with the latter independently of the supporting-spindle, substantially as described.

CAUGHEY S. FLEMING.

Witnesses:
J. L. SHOWERS,
ELI M. BOWERS.